United States Patent [19]

Honiden et al.

[11] Patent Number: 5,461,714
[45] Date of Patent: * Oct. 24, 1995

[54] APPARATUS FOR SYNTHESIZING AN OBJECT DESCRIBED IN AN OBJECT-ORIENTED LANGUAGE ON THE BASIS OF A PREDETERMINED SPECIFICATION

[75] Inventors: Shinichi Honiden, Tokyo; Takeshi Kohno, Yokohama, both of Japan

[73] Assignee: Kabushiki Kaisha Toshiba, Kawasaki, Japan

[ * ] Notice: The portion of the term of this patent subsequent to Oct. 4, 2011 has been disclaimed.

[21] Appl. No.: 272,231

[22] Filed: Jul. 8, 1994

Related U.S. Application Data

[63] Continuation of Ser. No. 763,587, Sep. 23, 1991, Pat. No. 5,353,371.

[30] Foreign Application Priority Data

Sep. 28, 1990 [JP] Japan .................................. 2-256866

[51] Int. Cl.⁶ .................................... G06F 15/18
[52] U.S. Cl. .......................... 395/2.67; 395/2.78; 395/10; 395/54; 395/62; 364/DIG. 1; 364/274; 364/274.3; 364/274.5; 364/275
[58] Field of Search ..................... 395/1, 80, 10, 395/54, 62, 2.67, 2.78, 800; 364/498

[56] References Cited

U.S. PATENT DOCUMENTS

| | | | |
|---|---|---|---|
| 5,038,296 | 8/1991 | Sano | 364/513 |
| 5,084,813 | 1/1992 | Ono | 395/1 |
| 5,151,867 | 9/1992 | Hooper et al. | 364/489 |
| 5,253,332 | 10/1993 | Kumamoto | 395/51 |
| 5,276,855 | 1/1994 | Kitahara | 395/500 |
| 5,353,371 | 10/1994 | Honiden et al. | 395/1 |

FOREIGN PATENT DOCUMENTS 2-259873  10/1990  Japan .
3-116281  8/1991   Japan .

OTHER PUBLICATIONS

Uchihira et al.; "Concurrent Program Synthesis with Resuable Component Using Temporal Logic"; IEEE 1987, pp. 455–464.

Honiden et al. "Prolog Based Concurrent Object Oriented Language"; IEEE 86; pp. 230–234.

Honiden et al.; "An Application of Structure Modeling and Automated Reasoning to Concurrent Program Design"; IEEE 1989; pp. 134–141.

Wolper; "Synthesis of Communicating Process from Temporal Logic Specification"; pp. 1–2, 54–104 UMI Dissertation Services 1982.

(List continued on next page.)

*Primary Examiner*—Krisna Lim
*Attorney, Agent, or Firm*—Finnegan, Henderson, Farabow, Garrett & Dunner

[57] ABSTRACT

A program synthesis system comprises a function decomposition unit for decomposing a function according to a predetermined specification so as to obtain detailed functions of the specification, a similarity decision unit for retrieving intermediates similar to the detailed specification detailed by the function decomposition unit, a design process fusion unit for fusing a plurality of design processes, the design process fusion unit including a matching decision unit for deciding matching between design processes having high similarities with respect to the intermediate decided by the similarity decision unit, an object synthesis unit for synthesizing an object on the basis of a new design process synthesized by the design process fusion unit, a design process intermediate knowledge base for storing intermediates from which intermediates similar to the specification detailed by the function decomposition unit are retrieved, and a design process conversion knowledge base for storing a conversion knowledge for detailing the specification, a conversion knowledge for the intermediate, and a knowledge in a minimum unit for performing processing.

2 Claims, 6 Drawing Sheets

OTHER PUBLICATIONS

Yonezawa, Akinori & Tokoro, Mario; "Object–oriented Concurrent Programming"; QA76.6 Q25 1987 ISBN 0–262–24026–2.

Seichi Komiya; "Automatic Programming by Composing Program Components and Its Realization Method"; Future Generations Computer System, vol. 5, No. 1, Aug. 1989, pp. 151–161.

Manna et al; "the Logical Basis for Computer Programming"; Addison–Wesley Publishing Company, 1990 vol. II; pp. 1–5.

Honiden et al. "An Application of Structural Modeling and Automated Reasoning to Real–time Systems Design," The Journal of Real–time Systems, vol. 1, No. 4, Apr. 1990, pp. 313–331.

Zohar Manna et al., "The Logical Basis for Computer Programming," Addison–Wesley Publishing Company, vol. I, 1990.

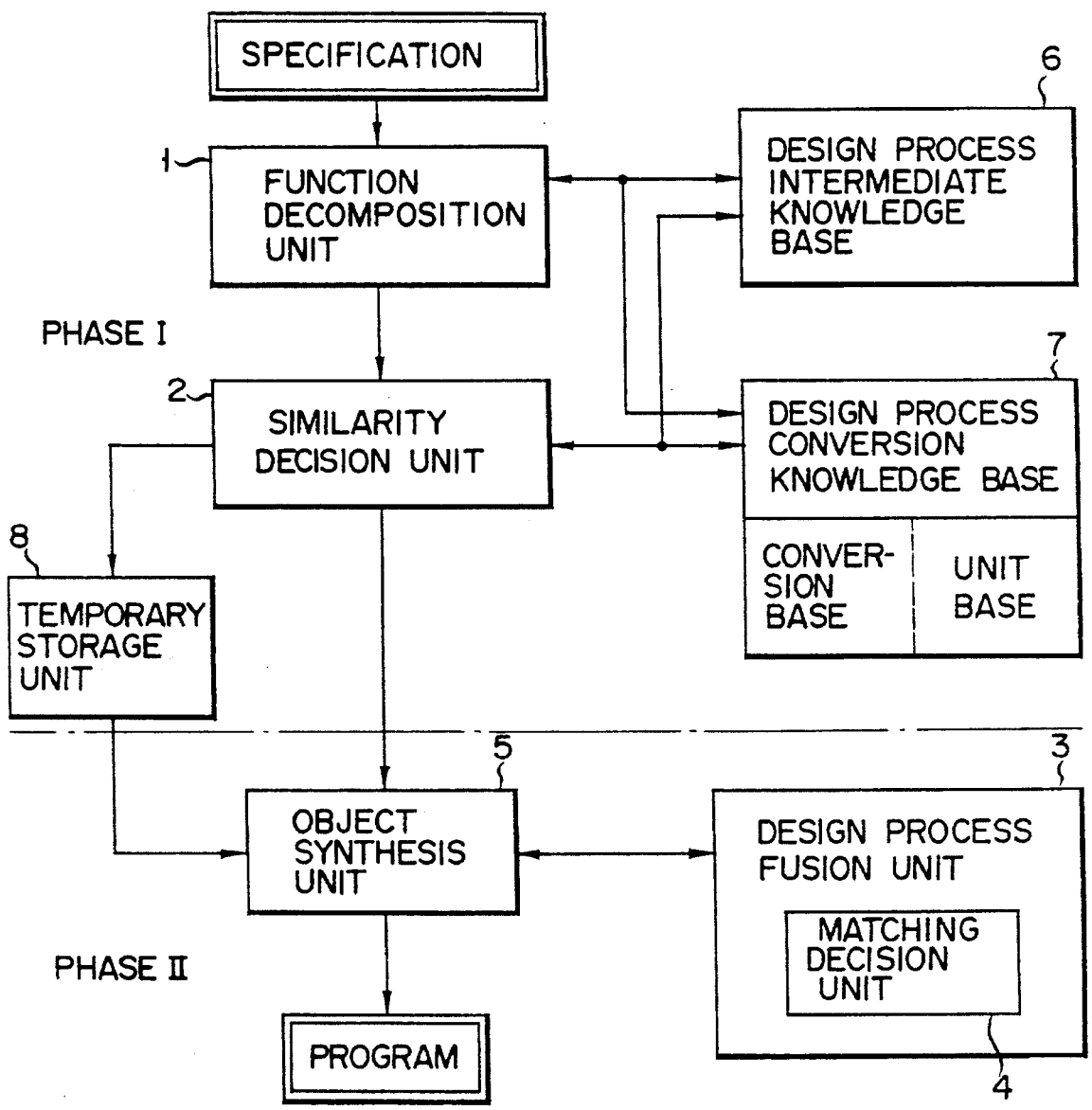
F I G. 1

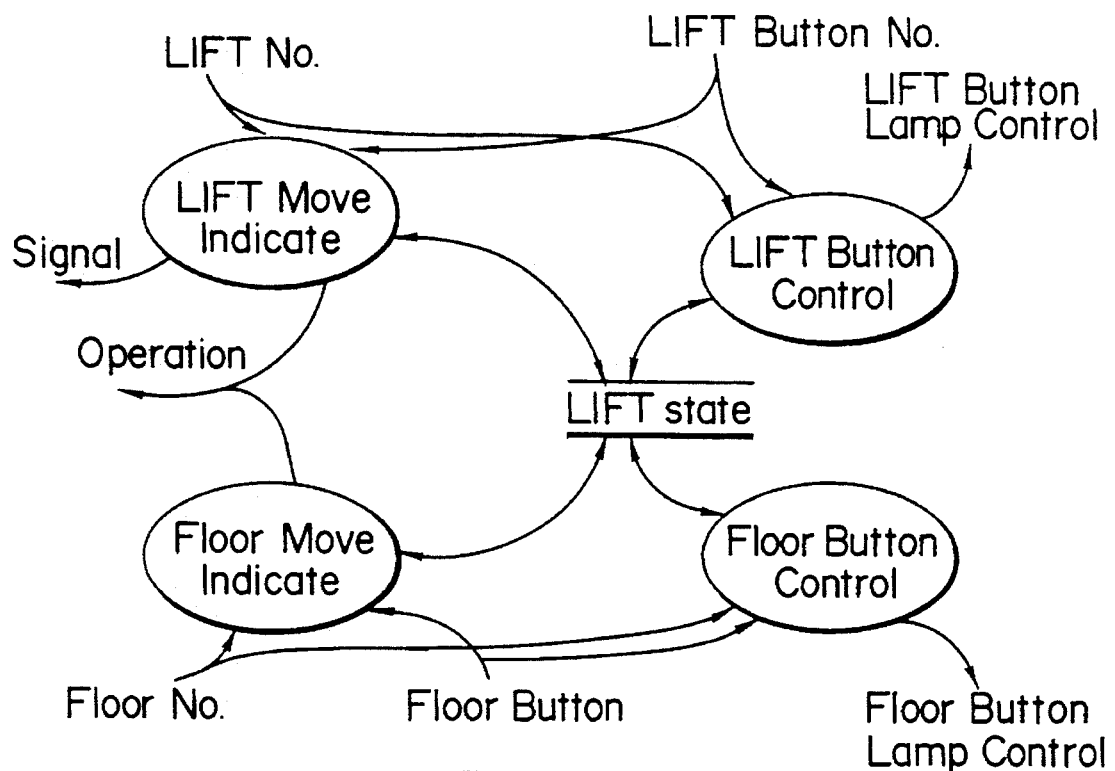
F I G. 5
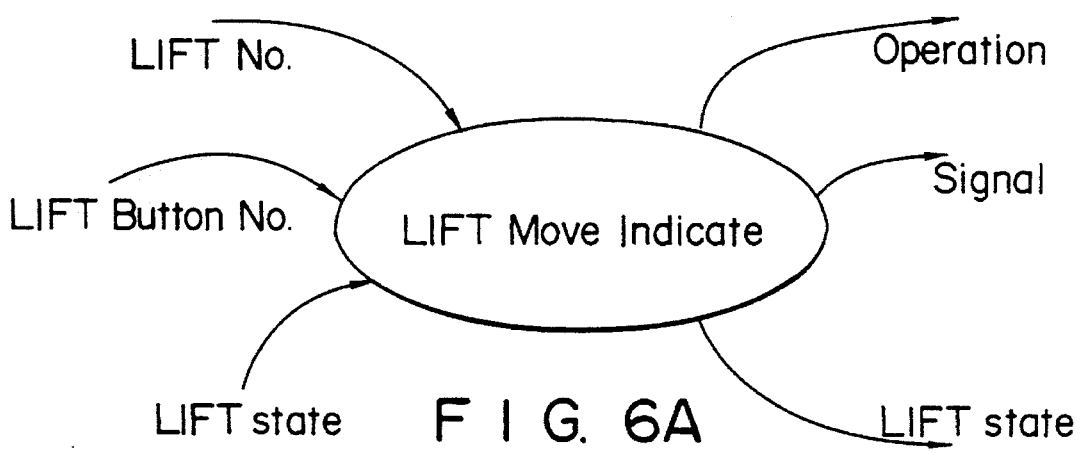
F I G. 6A
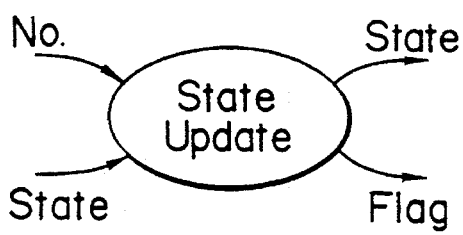
F I G. 6B
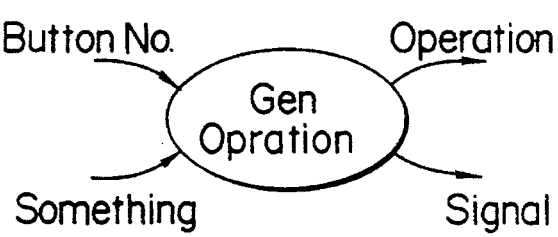
F I G. 6C

```
data
transformer:   LIFT Control System
    in Sort:   LIFT No.,
               LIFT Button No.,
               Floor No.,
               Floor Button
   out Sort:   LIFT Lamp Control,
               Floor Button Lamp Control Signal,
               Operation
   loc Sort:   LIFT state
       opns:   LIFT Button Control:  LIFT No., LIFT Button No., LIFT state
                                  -> LIFT Button Lamp Control
               Floor Button Control: Floor No., Floor Button, LIFT state
                                  -> Floor Button Lamp Control
               LIFT Move Indicate:   LIFT No., LIFT Button No., LIFT state
                                  -> Operation, LIFT state, Signal
               Floor Move Indicate:  Floor No., Floor Button, LIFT state
                                  -> Operation, LIFT state eqns:
```

FIG. 7A

```
<data transformer>::= data transformer:<data transformer name>
                     inSort:<sort name list>
                     out Sort:<sort name list>
                     loc Sort:<sort name list>
                     opns:<oplist>
                     eqns:<eqlist>

<object name>::=<name>
       <name>::=<name>
<sort name list>::=<name list>
<oplist>::=(<name list>:(<name list>]–><name>)⁺
<eqlist>::=(<term>=<term>)⁺
<name list>::=[<name>,]⁺<name>
```

FIG. 7B

APPARATUS FOR SYNTHESIZING AN OBJECT DESCRIBED IN AN OBJECT-ORIENTED LANGUAGE ON THE BASIS OF A PREDETERMINED SPECIFICATION

This is a continuation under 37 C.F.R. §160 of prior application Ser. No. 07/763,587, filed Sep. 23, 1991, now U.S. Pat. No. 5,353,371, issued on Oct. 4, 1994.

BACKGROUND OF THE INVENTION

1. Field of the Invention

The present invention relates to a program synthesis system for generating a program by synthesizing an object described in an object-oriented language on the basis of a predetermined specification, e.g., a formal specification described in an algebraic specification description language.

2. Description of the Related Art

When an object described in an object-oriented language is generated on the basis of a given formal specification, the following methods are employed.

In one method, a given formal specification is detailed stepwise according to a predetermined procedure by positive intervention of man, and thereafter, an object is synthesized. In this method, however, since the program is generated by intervention of man, it is difficult to guarantee quality of the generated program. Furthermore, different programs may be generated depending on the degree or method of intervention of man. Therefore, it is difficult to generate a high-quality program unless the above-mentioned method is executed by a considerably skilled person.

A method of synthesizing an object by an automatic certification scheme has also been studied. However, the size of a program which can be generated is very small yet. Therefore, it is difficult to generate a program having a practical level size.

As described above, it is difficult to synthesize a high-quality program having a practical level size.

For the purpose of improving productivity of software, component conversion or re-utilization techniques of software have been proposed. However, the component conversion or re-utilization techniques of software suffer from the following problems, and requirements for high productivity cannot always be satisfied.

The conventional component conversion or re-utilization techniques of software suffer from the following problems. That is, 1) Since these techniques have no conversion knowledge for functionally decomposing given predetermined specifications, the specifications cannot be effectively functionally decomposed.

2) No efficient retrieval means for retrieving components having similar functions has been established.

3) No procedure for partially correcting a retrieved component has been established.

As described above, it is very difficult to synthesize a program on the basis of a given predetermined specification while assuring both high productivity and high quality.

As the reference associated with the present invention, Zohar Manna and Richard Waldinger, "The Logical Basis for Computer Programming; Vol. 2 *Deductive Systems*", ADDISON-WESLEY PUBLISHING COMPANY (1990) is known.

SUMMARY OF THE INVENTION

It is an object of the present invention to provide a program synthesis system which can synthesize a desired program on the basis of a predetermined specification, e.g., a formal specification described in an algebraic specification description language while assuring both high productivity and high quality.

A program synthesis system according to the present invention is comprised of a design process intermediate knowledge base, a design process conversion knowledge base, a function decomposition unit, a similarity decision unit, a design process fusion unit, and an object synthesis unit. The design process intermediate knowledge base stores a plurality of intermediates (i.e., data transformers) which are obtained in a given design process, and the design process conversion knowledge base stores a first conversion knowledge that details a given specification and a second conversion knowledge that specifies the relationship of the intermediates, and a minimum knowledge that is used for performing a desired processing having an input and output.

The function decomposition unit (1) decomposes a function according to the predetermined (or given) specification using the first conversion knowledge so as to obtain detailed specifications of the given specification.

The similarity decision unit (2) retrieves intermediates stored in the design process intermediate knowledge base similar to the detailed specification detailed by the function decomposition unit.

The design process fusion unit (3) merges a plurality of design processes. The design process fusion unit includes a matching decision unit (4) for deciding matching between design processes having high similarities with respect to the intermediate decided by said similarity decision unit using the second conversion knowledge and the minimum unit knowledge.

Finally, the object synthesis unit (5) synthesizes an object on the basis of a new design process synthesized by said design process fusion unit.

In the program synthesis system according to the present invention, an object described in an object-oriented language is cooperated with the predetermined specification to cope with a new specification or a change in specification, thereby synthesizing a new object.

A program synthesis system according to the present invention is characterized in that a program synthesis method comprises several steps. The first step details a given predetermined specification, and retrieves intermediates similar to the specification, and conversion knowledge from the intermediates to next intermediates. The first step includes the substep of decomposing the intermediate to a function in a minimum unit when no intermediate similar to the specification is found.

The second step decides matching between design processes of the conversion knowledges retrieved in the first step. In the third step merging a plurality of design processes upon addition of a new function is performed and in the fourth step synthesizing an object on the basis of a new design process generated upon fusing is done.

Upon execution of the above-mentioned steps, when a new function is added or an environment is changed, or even when a conflict occurs among objects, a design process matching with use can be obtained by cooperating the objects with each other, and by re-utilizing a design process of its own object or another object. Therefore, a program having a practical level size can be synthesized on the basis of a predetermined specification without intervention of man.

As described above, according to the present invention, great practical advantages can be provided. That is, a high-quality program based on a given predetermined specification can be synthesized with high productivity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 2, 3A, 3B, 3C, 4, 5, 6A, 6B, 6C, 7A, and 7B show a program synthesis system according to one embodiment of the present invention, in which:

FIG. 1 is a schematic block diagram showing a functional arrangement according to the embodiment of the present invention;

FIG. 2 is a view showing an intermediate as a retrieval unit according to the embodiment of the present invention;

FIGS. 3A, 3B and 3C show data transformers when a given data transformer shown in FIG. 2 is decomposed;

FIG. 4 is a diagram showing one example of data transformers according to the present invention;

FIG. 5 is a diagram showing data transformers decomposed by a function decomposition unit;

FIG. 6A is a diagram showing one data transformer in FIG. 5;

FIGS. 6B and 6C show data transformers as intermediates similar to FIG. 6A;

FIG. 7A shows an algebraic specification of the data transformer shown in FIG. 6A; and FIG. 7B shows a syntax for the algebraic specification shown in FIG. 7A.

DETAILED DESCRIPTION OF THE PREFERRED EMBODIMENTS

Figure 2:
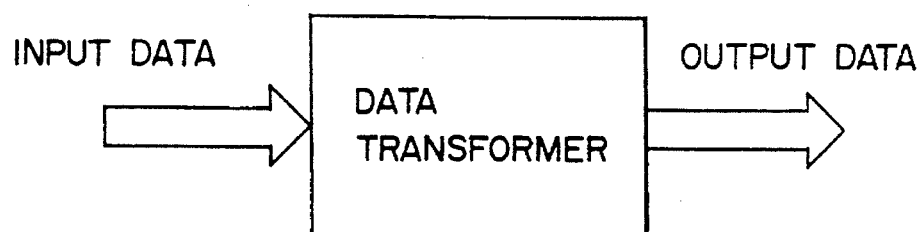

A program synthesis system according to one embodiment of the present invention will be described below with reference to the accompanying drawings.

FIG. 1 is a schematic block diagram showing a functional arrangement according to the embodiment of the present invention.

In FIG. 1, the program synthesis system of the present invention has two functions conceptually represented by Phase I and Phase II.

As shown in FIG. 1, Phase I includes a function decomposition unit 1, a similarity decision unit 2, a design process intermediate knowledge base 6, a design process conversion knowledge base 7, and a temporary storage unit 8 used for data processing, and Phase II includes a design process fusion unit 3, a matching decision unit 4 (included in the design process fusion unit 3), and an object synthesis unit 5.

Before a description of this embodiment is given, a data transformer will be described below.

In the system of this embodiment, a predetermined specification given for generating a program and an intermediate stored in the design process intermediate knowledge base 6 are defined as a data transformer. The data transformer is one unit for processing input data, and generating output data, as shown in FIG. 2. Furthermore, input/output (I/O) data of the data transformer to be processed in this embodiment is assumed to be described in detail according to a predetermined format, and the functions of the data transformer are assumed to be described in an algebraic specification description language.

Figure 3A:
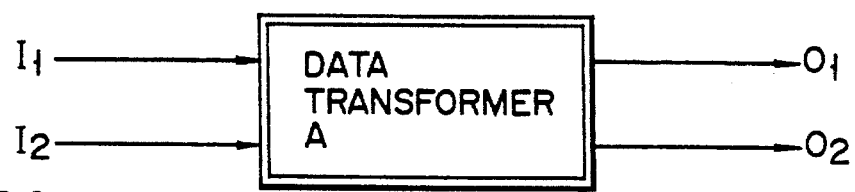
Figure 3B:
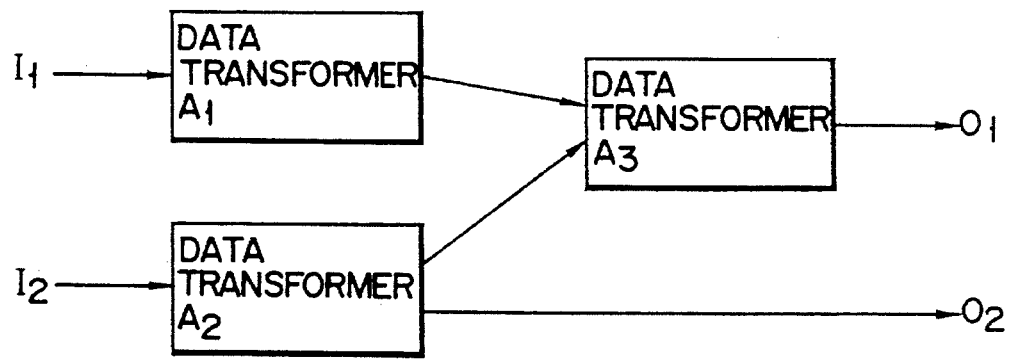
Figure 3C:
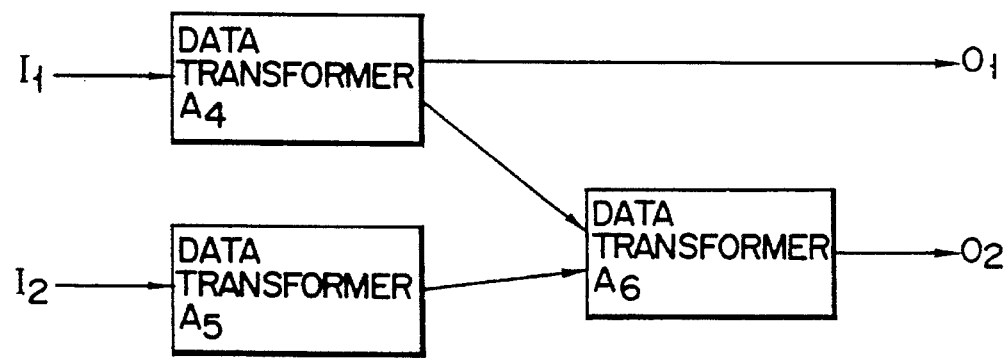

The data transformer is constituted by a plurality of data transformers, and data flows among the plurality of data transformers (see FIG. 3A). A given data transformer is detailed (decomposed to lower levels) as follows. The data transformer shown in FIG. 3A is detailed by describing it in a lower-level data transformer shown in FIG. 3B or 3C.

In the following description of the embodiment of the present invention, a given predetermined specification is represented by a data transformer A, and an intermediate is represented by a data transformer B. Data transformers obtained by detailing the data transformer A are expressed by data transformers A', and data transformers obtained by detailing the data transformer B are expressed by data transformers B'.

Figure 4:
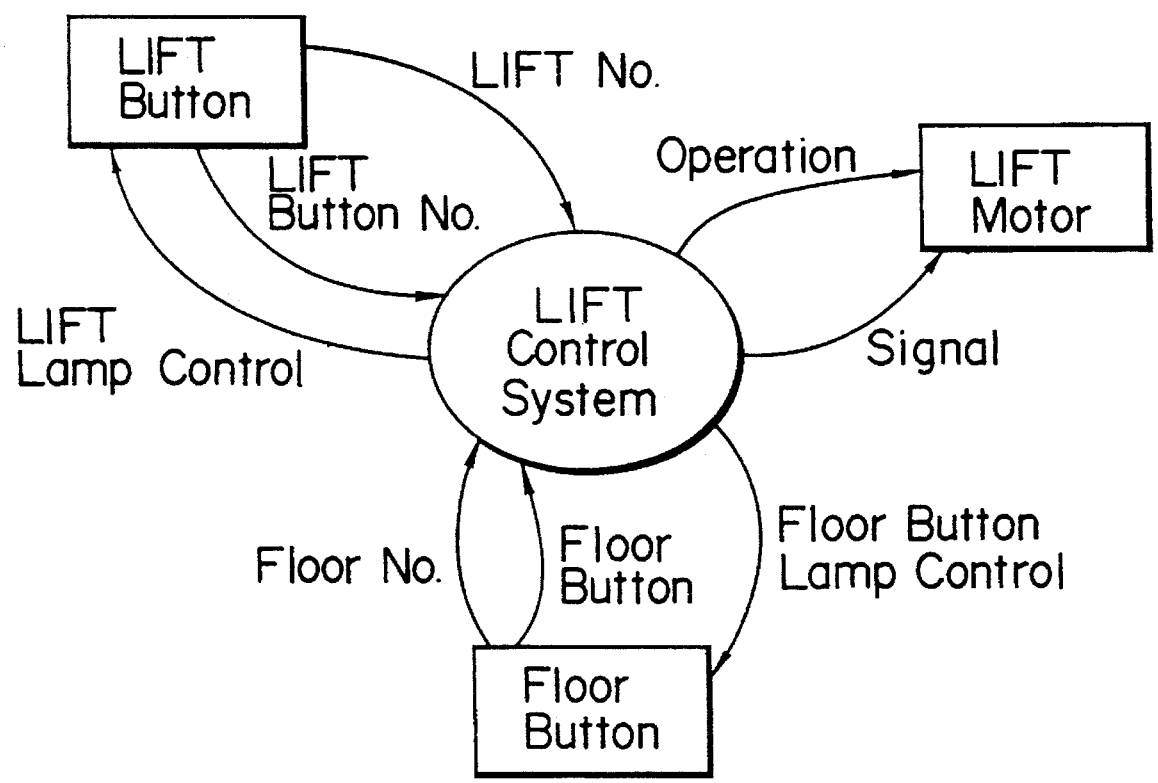

FIG. 4 shows an example of the data transformer A. "LIFT Control System" in FIG. 4 has a function of controlling "LIFT Motor" in accordance with input signals from "LIFT Button" and "Floor Button". The "LIFT Control System" receives "Floor No." signal and "Floor Button" signal from "Floor Button", and outputs "Floor Button Lamp Control" signal to "Floor Button". Similarly, "LIFT Control System" receives "LIFT No." signal and "LIFT Button No." signal from "LIFT Button", and outputs "LIFT Lamp Control" signal to "LIFT Button". "LIFT Control System" outputs "Operation" and "Signal" signals to "Lift Motor" in accordance with control signals from "Floor Button" and "LIFT Button", thereby controlling "LIFT Motor".

A method of synthesizing a program by the system of this embodiment will be described hereinafter.

First, Phase I will be performed as following manner.

The function decomposition unit 1 has a function of detailing a given predetermined specification stepwise, and decomposes the data transformer A to a lower-level data transformer (data transformers A'). FIG. 5 shows "LIFT Control System" shown in FIG. 4 which is decomposed to a lower-level data transformer by the function decomposition unit 1. As shown in FIG. 5, "LIFT Control System" is decomposed to "LIFT Button Control", "Floor Button Control", "LIFT Move Indicate", and "Floor Move Indicate" as four data transformers A'. Of the four data transformers, the former two data transformers are those for inputting control signals, and the latter two data transformers are those for controlling "LIFT Motor".

The similarity decision unit 2 has a function of retrieving an intermediate (a data transformer B or a data transformer B') similar to a data transformer A' from the design process intermediate knowledge base 6 in accordance with the data transformers A' decomposed by the function decomposition unit 1. A similarity between the data transformer A' and the data transformer B is decided in consideration of I/O data of the data transformer A' and the data transformer B. The similarity of the data transformers is calculated as follows.

That is, similarities among a plurality of I/O data are calculated, and are accumulated.

The data are managed on the basis of a semantic network, and whether given data semantically corresponds to a high-level concept or low-level concept of another data is decided by following the semantic network.

A similarity between data is defined by the distance between nodes on the semantic network. The distance between nodes means the total number of nodes included in a pass extending from a given node to another node. The accumulation of similarities among data transformers corresponds to a sum of the number of data each having a similarity less than 3 of I/O data of other data transformers when viewed from a given data transformer.

A data transformer B retrieved by the above-mentioned method is stored in the design process intermediate knowledge base 6. In the data transformer B, a conversion knowledge for converting the data transformer B similar to the data transformer A' to a lower-level data transformer (data transformers B') as the next intermediate is additionally described, and is stored in the design process conversion knowledge base 7. Furthermore, the design process conversion knowledge base 7 also stores unit data transformers decomposed to decrease the number of I/Os as much as possible.

The conversion knowledge has two kinds of knowledges, i.e., a detailing knowledge and a meta-knowledge, and is retrieved from the design process conversion knowledge base 7 by the similarity decision unit 2 in association with the data transformer B.

The detailing knowledge is a detailed knowledge for actually detailing a predetermined specification. For example, the detailing knowledge has information as follows:

1) information obtained by describing a detailed decomposition process of the data transformer B using an algebraic specification description, 2) information obtained by describing arithmetic operations associated with I/O data of the data transformer B using the algebraic specification description.

Where, the above-mentioned pieces of information may be described not in the algebraic specification description but in other formats, e.g., a natural language description.

The meta-knowledge is a knowledge corresponding to a supplementary explanation of an abstract expression of the detailing knowledge, and for example, has the following knowledges:

1) a knowledge for heuristically decomposing a data transformer B having many I/O data so as to decrease the number of I/O data of data transformers as much as possible, 2) a knowledge for decomposing a data transformer B so that one output data corresponds to one function, 3) a knowledge for decomposing a data transformer B on the basis of the description of the right-hand side of an equation describing the specification of the data transformer B, and 4) a knowledge for decomposing a data transformer B in accordance with execution performance associated with a description content of the data transformer B.

FIG. 6A shows "LIFT Motor Indicate" (data transformer A') in FIG. 5. "LIFT Motor Indicate" has three inputs, i.e., "LIFT No", "LIFT Button No", and "LIFT State", and three outputs i.e., "Operation", "Signal", and "LIFT State". The similarity decision unit 2 retrieves data transformers having I/Os similar to those shown in FIG. 6A. Assume that two data transformers, i.e., "State Update" and "Gen Operation", are found as those similar to the data transformer A' as a result of retrieval. FIG. 6B shows I/Os of the data transformer "State Update" (data transformer $B_1$), and FIG. 6C shows I/Os of the data transformer "Gen Operation" (data transformer B2). The data transformer $B_1$ has two inputs, i.e., "No." and "State", and two outputs, i.e., "State" and "Flag". The data transformer $B_2$ has two inputs, i.e., "Button No." and "Something" and two outputs, i.e., "Operation" and "Signal".

In the semantic network used in retrieval of data transformers similar to the data transformer A', correspondences, i.e., "LIFT No." of the data transformer A'= "No." of the data transformer $B_1$, "LIFT State" of the data transformer A'= "State" of the data transformer $B_1$, and "LIFT Button No." of the data transformer A'= "Button No." of the data transformer $B_2$, are found in inputs. The same applies to outputs. Thus, the similarity decision unit 2 retrieves the data transformers $B_1$ and $B_2$ as those similar to the data transformer A'.

FIG. 7A shows a specification of the data transformer A' shown in FIG. 6A described in the algebraic specification description language. FIG. 7B shows a syntax for the algebraic specification shown in FIG. 7A.

Information of the data transformer A' obtained by the above-mentioned operations (e.g., information of the data transformer A' itself, and detailing information), and pieces of information of the data transformers B and B' similar to those of the data transformer A' are stored in the temporary storage unit 8.

With the above-mentioned operations, the given predetermined specification is decomposed to the data transformers A' by the function decomposition unit 1, and similar data transformers B' are retrieved by the similarity decision unit 2 (Phase I).

Design processes are fused by the following operation to synthesize a program (Phase II).

The object synthesis unit 5 synthesizes an object which reflects differences between the data transformers A and B on the basis of the conversion knowledge of the design process conversion knowledge base 7 and information stored in the temporary storage unit 8. Upon synthesis of the object, the differences between the data transformers A and B are classified into the following three cases:

1) I/O elements of the data transformer B include I/O elements of the data transformer A.

2) I/O elements of the data transformer A include I/O elements of the data transformer B.

3) Some I/O elements of the data transformer A are equal to some I/O elements of the data transformer B.

The object synthesis unit 5 synthesizes an object on the basis of the above-mentioned three cases in cooperation with the matching decision unit 4 and the design process fusion unit 3.

The term is defined as follows.

The sentence "I/O elements of the data transformer B [include] I/O elements of the data transformer A" means that [all the elements presented as I/O data of the data transformer A are expressed by I/O data of the data transformer B]. In this case, I/O data to be dealt with need not always syntactically coincide with each other, but need only semantically coincide with each other.

If the content of a given element I of the data transformer A is a lower-level concept of the content of an element J of the data transformer B, and if all the other elements of the data transformer A are equal to all the other elements of the data transformer B, it means that the data transformer B includes the data transformer A, but the data transformer A does not include the data transformer B.

With the above-mentioned definition, a re-utilization method of a design process of each of the above-mentioned three cases will be explained below.

(1) When [I/O elements of data transformer B include I/O elements of data transformer A]

The data transformer B is decomposed by the similarity decision unit 2 to generate a data transformer corresponding to a low-level concept immediately below the data transformer B. It is checked if a data transformer consisting of only elements of the data transformer A is present in the decomposed data transformer. If it is determined that no data transformer consisting of only elements of the data transformer A is present in the data transformer corresponding to the low-level concept immediately below the data transformer B, the generated data transformers are further decomposed, and decomposition is performed until each data transformer can no longer be decomposed, i.e., until the number of each of input and output elements of each data transformer becomes 1. when the number of each of input and output elements of each data transformer becomes 1, if there is no data transformer consisting of only elements of the data transformer A in the decomposed data transformer, it is determined that the retrieved data transformer B is semantically different from the data transformer A, and another data transformer C is retrieved in place of the data transformer B.

Contrary to this, if a data transformer consisting of only elements of the data transformer A is present in the decomposed data transformer, it is determined that the data transformer B is similar to the data transformer A, and only data transformers coinciding with the data transformer A are extracted from the data transformer B. Finally, the object synthesis unit 5 synthesizes a program for the data transformer A by utilizing the conversion knowledges added to the extracted data transformers.

(2) When [I/O elements of data transformer A include I/O elements of data transformer B]

The elements of the data transformer B are subtracted from the elements of the data transformer A, and an intermediate is retrieved using the remaining elements as a retrieval key. An intermediate found by the retrieval is represented by a data transformer C. The data transformer C is decomposed in the same manner as in case (1), thereby extracting a conversion knowledge necessary for the data transformer A. The conversion knowledge of the data transformer A, and the conversion knowledge included in the data transformer C and necessary for the data transformer A are merged by the matching decision unit 4 and the design process fusion unit 3. On the basis of the merging result, the object synthesis unit 5 synthesizes a program for the data transformer A.

(3) When [some I/O elements of data transformer A are equal to some I/O elements of data transformer B]

The data transformer B is decomposed in the same manner as in case (1) to extract only data transformers associated with the data transformer A, thereby obtaining conversion knowledges added to the extracted data transformers. Then, the elements of the data transformer B are subtracted from the elements of the data transformer A in the same manner as in case (2) to obtain a data transformer C using the remaining elements of the data transformer A as a retrieval key, and thereafter, a conversion knowledge necessary for the data transformer A is retrieved.

FIGS. 6A to 6C correspond to the case (3). In this case, the data transformer $B_1$ is retrieved by the similarity decision unit 2 as a data transformer similar to the data transformer A'. Then, elements of the data transformer $B_1$ are subtracted from the data transformer A', and the data transformer $B_2$ is retrieved by the similarity decision unit 2 as the remaining elements of the data transformer A'. Matching between the retrieved data transformers $B_1$ and $B_2$, and the data transformer A' is decided by the matching decision unit 4 on the basis of the contents of the design process conversion knowledge base 7 and the temporary storage unit 8.

The two kinds of conversion knowledges obtained in this manner are merged by the matching decision unit 4 and the design process fusion unit 3. By utilizing a design process as a merging result, the object synthesis unit 5 synthesizes a program for the data transformer A.

By utilizing the present invention upon coping with a new specification or a change in specification, since a new design process, intermediate, and conversion knowledge are stored in the design process intermediate knowledge base 6 and the design process conversion knowledge base 7, the knowledge bases can be expanded every time a new design process is performed.

As described above, an intermediate (data transformer B) having a high similarity to a given predetermined specification (data transformer A) is retrieved (Phase I). Matching between design processes is decided on the basis of the retrieved intermediate and a conversion knowledge added to the intermediate, and a plurality of design processes are properly fused to synthesize a new design process (Phase II). Therefore, according to the present invention, a high-quality program free from conflicts can be synthesized with high productivity.

The present invention is not limited to the above embodiment. For example, as a conversion knowledge to an intermediate, a knowledge other than the above-mentioned detailing knowledge and the meta-knowledge may be used. In the description of the embodiment, the algebraic specification description language is used as the format of a data transformer. However, other languages may be used. In the above embodiment, the temporary storage unit 8 is used for temporarily storing a new design process. However, the data transformer A', the conversion knowledge, and the like may be stored as knowledge bases in the design process intermediate knowledge base 6 and the design process conversion knowledge base 7. Furthermore, a decomposition scheme to an intermediate may be variously modified. Thus, various changes and modifications may be made within the spirit and scope of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. Program synthesis computer system comprising:

design process intermediate knowledge base for storing a plurality of intermediates obtained by a design process, each of said plurality of intermediates having first conversion knowledge for detailing a given specification for converting itself to lower-level intermediates and second conversion knowledge including supplementary knowledge for detailing said intermediates;

design process conversion knowledge base for storing minimum unit knowledge associated with minimum unit which performs conversion processing of said first conversion knowledge, said second conversion knowledge and input/output data;

function decomposition means for decomposing function according to said given specification based on said first conversion knowledge to obtain detailed specifications of said given specification;

similarity decision means for calculating similarity based on input/output data of said minimum unit knowledge and for properly extracting similar intermediates as detailed specifications detailed by said function decomposition means from said design process intermediate knowledge base according to a calculated similarity and a conversion knowledge;

design process fusion means for deciding similarities among conversion knowledges included in intermediates properly extracted by said similarity decision means and for synthesizing new design process by fusing conversion knowledges included in said intermediates based on a decision result; and an object synthesis means for synthesizing object oriented program based on said new design process obtained by said design process fusion means.

2. A computer-implemented method for synthesizing an object-oriented program comprising the steps of:

storing a plurality of intermediates obtained by a design process, each of said plurality of intermediates having first conversion knowledge for detailing a given specification for converting itself to lower-level intermediates and second conversion knowledge including supplementary knowledge for detailing said intermediates;

storing minimum unit knowledge associated with a minimum unit that performs conversion processing of said first conversion knowledge, said second conversion knowledge, and input/output data;

decomposing a function according to said given specification based on said first conversion knowledge to obtain detailed specifications of said given specification;

calculating a similarity based upon the input/output data of said minimum unit knowledge;

extracting similar intermediates as detailed specifications from the plurality of stored intermediates obtained by the design process;

designing similarities among conversion knowledges included in said similar intermediates;

synthesizing a new design process by fusing conversion knowledges included in said similar intermediates based on a decision result; and synthesizing the object-oriented program based on said new design process.

* * * * *